US009497156B2

(12) United States Patent
Ahn et al.

(10) Patent No.: US 9,497,156 B2
(45) Date of Patent: *Nov. 15, 2016

(54) SUGGESTED OUT OF NETWORK COMMUNICATION RECIPIENTS

(71) Applicant: LinkedIn Corporation, Mountain View, CA (US)

(72) Inventors: Junghoon (Andrew) Ahn, Cupertino, CA (US); Abhishek Gupta, San Francisco, CA (US); Christian Posse, Forster City, CA (US); Anmol Bhasin, Los Altos, CA (US); Yurong Shi, San Jose, CA (US); Jian Li, Cupertino, CA (US); Jacob Kessler, Palo Alto, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/923,182

(22) Filed: Oct. 26, 2015

(65) Prior Publication Data
US 2016/0043987 A1 Feb. 11, 2016

Related U.S. Application Data

(63) Continuation of application No. 14/621,633, filed on Feb. 13, 2015, now Pat. No. 9,191,356, which is a continuation of application No. 13/772,870, filed on Feb. 21, 2013, now Pat. No. 8,972,417.

(60) Provisional application No. 61/749,755, filed on Jan. 7, 2013.

(51) Int. Cl.
G06F 17/30 (2006.01)
H04L 12/58 (2006.01)
H04L 29/08 (2006.01)

(52) U.S. Cl.
CPC ......... *H04L 51/32* (2013.01); *G06F 17/30861* (2013.01); *G06F 17/30867* (2013.01); *H04L 67/306* (2013.01)

(58) Field of Classification Search
CPC ................... G06F 17/30861; G06F 17/30867; H04L 51/32; H04L 67/306
See application file for complete search history.

(56) References Cited

U.S. PATENT DOCUMENTS 7,069,308 B2 6/2006 Abrams
8,972,417 B2 3/2015 Ahn et al.
9,191,356 B2 11/2015 Ahn et al.
(Continued)

OTHER PUBLICATIONS

U.S. Appl. No. 13/772,870, Notice of Allowance mailed Oct. 27, 2014, 13 pgs.
(Continued)

*Primary Examiner* — Jorge A Casanova
(74) *Attorney, Agent, or Firm* — Schwegman Lundberg & Woessner, P.A.

(57) ABSTRACT

Disclosed in some examples are methods, systems and machine readable medium for recommending an out-of-network communication by determining a set of potential recommended members of a social networking service based upon one or more recommendation criteria. In some examples the recommendation criteria may include: a profile similarity to a previous target of an out-of-network communication, a degree of correspondence between an interest and intent of the sending member, and a likelihood of response.

21 Claims, 8 Drawing Sheets

(56) References Cited

U.S. PATENT DOCUMENTS

| | | |
|---|---|---|
| 2009/0319288 A1 | 12/2009 | Slaney et al. |
| 2010/0153290 A1 | 6/2010 | Duggan |
| 2012/0311036 A1 | 12/2012 | Huhn |
| 2013/0031090 A1 | 1/2013 | Posse et al. |
| 2013/0165234 A1 | 6/2013 | Hall et al. |
| 2013/0254213 A1 | 9/2013 | Cheng et al. |
| 2013/0304829 A1 | 11/2013 | Olsen et al. |
| 2013/0325734 A1 | 12/2013 | Bixler et al. |
| 2014/0195549 A1 | 7/2014 | Ahn et al. |
| 2015/0163190 A1 | 6/2015 | Ahn et al. |

OTHER PUBLICATIONS

U.S. Appl. No. 14/621,633, Notice of Allowance mailed Aug. 14, 2015, 9 pgs.
U.S. Appl. No. 14/621,633, Preliminary Amendment filed Feb. 25, 2015, 11 pgs.

FIG. 3

Send Out-Of-Network Message john.smith@linkedin.com

Category

Subject

Dear John,
I ran across your profile and was curious if you are potentially in the market to consider tackling some challenging problems at SoftCo. The Ads team is experiencing tremendous growth this year, and we currently have openings for seasoned Mobile or Tablet UX Designer.
Please send me your resume and portfolio if interested.

David Jones
Recruiter, Corporate Operations (Send) (Save Draft)

People in Common — 3010
- James Adams, Designer
- Lisa Tentra, Sales at Netflix
- Christopher Illy, Web Designer Experience in Common
- Megalith Corp., Worked together in 2012

Education in Common
- Eagle State, Studied together in 2011

Limit your message to 100 words — 3020

3000

PEOPLE YOU MAY WANT TO CONTACT

Similar to John Smith
Product Manager at Lagunita Systems Inc.,
"Opportunity for Product Manager at Bay Area Start Up" Sent on February 1, 2013

| | James Jones<br>Product Manager at Corp Y. | Send Message |
|---|---|---|
| | Based on Geography and Function | |

| | Julie Delao<br>Product Manager at Fun Inc. | Send Message |
|---|---|---|
| | Based on Geography and Function | |

| | Cynthia Antoneiii<br>Product Manager at Corp Y. | Send Message |
|---|---|---|
| | Based on Geography and Function | |

| | George Mann<br>Product Manager at Mobi | Send Message |
|---|---|---|
| | Based on Geography, Function, and Seniority | |

| | Sharon Howard<br>Product Sales at Mobi | Send Message |
|---|---|---|
| | Based on Geography and Seniority | |

| | Oscar Spinney<br>Sales at Corp Y. | Send Message |
|---|---|---|
| | Based on Seniority | |

▶ See More

Similar to Leo Fitzsimmons
Principal Software Engineer at Psychic Systems
"Software Engineer Opening at Best Networking" Sent on January 31, 2013

| | Sandra J. Ponce<br>Product Manager at Net Inc. | Send Message |
|---|---|---|
| | Based on Geography, Seniority, and Industry | |

| | Julie Delao<br>Product Manager at Fun Inc. | Send Message |
|---|---|---|
| | Based on Geography and Function | |

| | George Mann<br>Product Manager at Mobi | Send Message |
|---|---|---|
| | Based on Geography, Function, and Seniority | |

| | Oscar Spinney<br>Sales at Corp Y. | Send Message |
|---|---|---|
| | Based on Seniority | |

SUGGESTED OUT OF NETWORK COMMUNICATION RECIPIENTS

CLAIM OF PRIORITY

This patent application is a continuation of U.S. patent application Ser. No. 14/621,633, filed Feb. 13, 2015, which is a continuation of U.S. patent application Ser. No. 13/772,870, filed Feb. 21, 2013, which claims the benefit of priority to U.S. Provisional Patent Application Ser. No. 61/749,755, filed on Jan. 7, 2013, each of which applications is hereby incorporated by reference herein in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright LinkedIn, All Rights Reserved.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 shows a user interface according to some examples of the present disclosure.

FIG. 5 shows a user interface according to some examples of the present disclosure.

DETAILED DESCRIPTION

Figure 1:
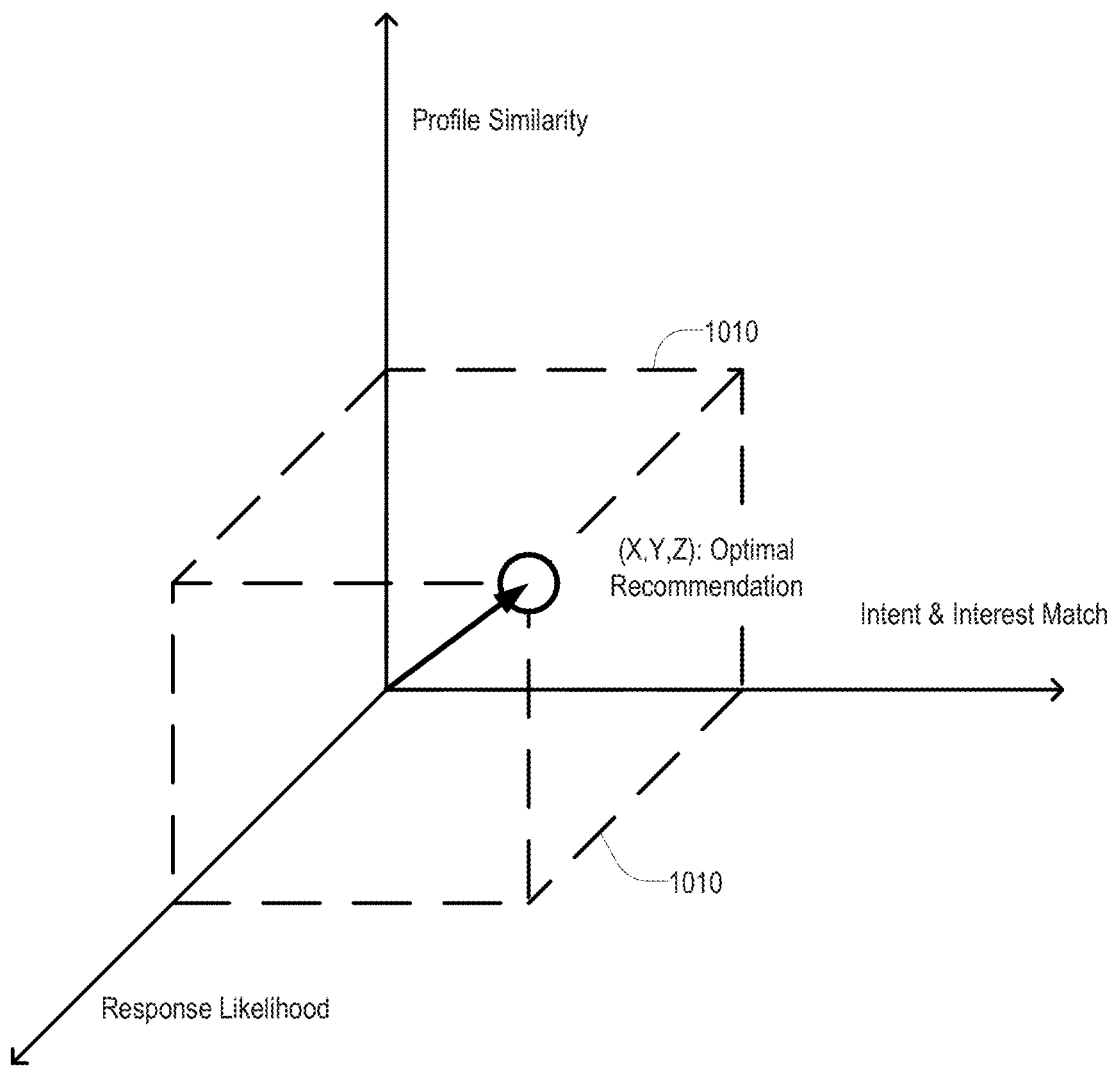
FIG. 1 shows a schematic of a recommendation algorithm according to some examples of the present disclosure.

In the following, a detailed description of examples will be given with references to the drawings. It should be understood that various modifications to the examples may be made. In particular, elements of one example may be combined and used in other examples to form new examples. Many of the examples described herein are provided in the context of a social or business networking website or service. However, the applicability of the inventive subject matter is not limited to a social or business networking service.

A social networking service may be an online service, platform or site that allows members of the service to build or reflect social networks or social relations among the members. Typically, members of the social networking service construct profiles, which may include personal information such as the member's name, contact information, employment information, photographs, personal messages, status information, links to web-related content, blogs, and so on. Generally, only a portion of a members profile may be viewed by the general public, and/or other members.

In order to build or reflect these social networks or social relations among members, the social networking service allows members to identify, and establish links or connections with other members. For instance, in the context of a business networking service (a type of social networking service), a person may establish a link or connection with his or her business contacts, including work colleagues, clients, customers, and so on. With a social networking service, a person may establish links or connections with his or her friends and family. A connection is generally formed using an invitation process in which one member "invites" a second member to form a link. The second member than has the option of accepting or declining the invitation.

Some social networking services may offer a subscription or following model instead of, or in addition to the connection model. A subscription or following model is where one member "follows" another member without mutual agreement. Typically in this model, the follower is notified of public messages and other communications posted by the member that is followed. An example social networking service that follows this model is Twitter, a micro-blogging service which allows members to follow other members without explicit permission.

In general, a connection or link represents, or is otherwise associated with, an information access privilege such that a first person who has established a connection with a second person is, via the establishment of that connection, authorizing the second person to view or access non-publicly available portions of their profiles which may include communications they have authored (e.g., blog posts, messages, "wall" postings, or the like). Of course, depending on the particular implementation of the business/social networking service, the nature and type of the information that may be shared, as well as the granularity with which the access privileges may be defined to protect certain types of data may vary greatly.

Social networking services may also facilitate communications to and from members. For example, the social networking service may provide or facilitate postings to special sections of a member's profile page, email messages, text messages, voice messages, or the like. Social networking services typically place restrictions on the ability to contact a member through these services to protect the privacy of members. For example, a member may not be allowed to send a communication to another member without the members being related to each other on the social networking service. For example, members may have to be directly connected—i.e., a $1^{st}$ degree connection, a $2^{nd}$ degree connection (e.g., a second degree connection is where the sending member and the recipient member are not directly connected, but are each directly connected with at least one common member), a $3^{rd}$ degree connection, or some other degree connection before utilizing certain communication mechanisms to communicate with each other on the social networking service. Thus a connection or link may also represent a communication access privilege. The restrictions placed on these communications may vary with the type of communication. For example, invitations to connect typically are not subject to these types of restrictions.

Despite these restrictions the social networking service may allow members to bypass these restrictions under certain conditions. For example, recruiters may wish to connect with job seeking members. Both the recruiter and the job seeking member may mutually benefit from being allowed to communicate without the requisite connection degree for the communication of that type.

While there are benefits to allowing members to bypass the communication restrictions, care must be taken to prevent abuse and to protect member privacy. In some examples, to prevent unsolicited emails (also referred to as spam messages), social networks may often charge a member to send a message to an "out-of-network" member. For convenient description, the term "out-of-network" communications may refer to email, messages, instant-messages, text messages, voice messages, or any other communications utilizing the social networking service which is from a sending member to a recipient member where the sending member and the recipient member do not meet the requirements (e.g., they are not within a particular connection degree) typically required by the social networking service for a communication of that type. While the term "out-of-network communication" implies that the requirement of the social networking service that is being bypassed is a connection degree requirement, the term is used for descriptive convenience and may refer generally to any communication that bypasses rules that a social networking service has with respect to the particular communication. Additionally, as used herein, the term "sending member" refers to a member of the social networking service that is interested in sending out-of-network messages. Recipient members are the recipients of those messages.

Despite the mutual benefits of these out-of-network messages, since there typically is no pre-existing relationship between these members, these messages tend to have low response rates (e.g., 20% is typical), which limits the value to the sending (and paying) member. Disclosed in some examples are methods, systems, and machine readable media to recommend recipient members to sending members for out-of-network communications. The members recommended may be chosen based upon one or more selection criteria that select members who are more likely to be receptive to the out-of-network message from the sending member. This may enhance response rates by more closely suggesting individuals who may be receptive to the out-of-network message.

The set of recommended members may come from a set of potential recommended members. The set of potential recommended members may be all the members of the social networking service or a subset of those members (e.g., privacy settings of some members may preclude any out-of-network messaging to the member).

In some examples, the selection criteria used to choose the members recommended may include one or more of: a measure of how closely a member matches the interests of the sending member, a measure of how closely a member's purpose (i.e., intent) for using the social networking service (e.g., job seeking) corresponds to the purpose for using the social networking service of the sending member (e.g., a recruiter), a measure of how closely a member matches one or more desired member profile attributes, how likely a particular member would respond to an out of network communication (e.g., based on activity on the social networking service), and the like. These recommendations may help members maximize their out-of-network messaging by allowing them to target their communications to other members that may be more receptive to their message, thereby increasing their response rates.

One example selection criteria may include a degree of similarity to one or more desired member profile attributes. The sending member may desire that receiving members have certain profile attributes. For example, a recruiter may be looking for someone with experience in a particular field, a person in a particular geographical area, a particular amount of experience, a particular job function, a combination of those, or others. Therefore, one factor in choosing members to recommend may be how closely a particular member matches these desired profile attributes (e.g., member profile similarity).

The particular member profile attributes that the sending member is interested in targeting may be determined in many ways. For example, the system may infer the profile attributes that the sending member is interested in by analyzing one or more profiles of previous recipients of out-of-network messages sent by the particular sending member. Information on profile attributes of previous members to which the sending member has already communicated with using out-of-network messages may send powerful signals on what members the sending member is interested in communicating with. In particular, the system may compare the profiles of these previous recipients with the profiles of the members in the set of potential recommended members to find other similar members.

In other examples, the sending member may explicitly choose one or more member profile attributes of interest for the purpose of creating the recommendations. For example, the sending member may explicitly tell the system that they are interested in members who have a profile attribute of "software engineer." The sending member may also select one or more entire profiles of individuals that closely match the type of person they are interested in contacting. The system may then use those profiles to find similar individuals. The system may provide one or more dialogue boxes to facilitate any of these selection processes.

The members in the set of potential recommended members may be scored based upon how closely they match the desired profile attributes of the sending member. For example, each of the members in the set of potential recommended members may be scored based upon the number of member profile attributes that match the member profile attributes of one or more previous recipients of out-of-network communications of the sending member. In yet other examples, the member profile attributes may not have to match exactly, but instead may be similar enough to be considered a match based on predetermined lists of member profile attributes that are determined to be similar (e.g., computer programmer and software engineer may be considered similar enough job titles to be considered a match). How similar each profile attribute is may also be weighted and scored. For example, a patent attorney and a copyright attorney are more similar than a patent attorney and a family law attorney. Thus if the desired member profile attribute is a copyright attorney, a member who is a patent attorney would get a higher match score than a member who is a family law attorney (even though all are attorneys). This may be determined by a predetermined list or table of related or similar profile attributes. The table may contain information on how similar pairs of profile attributes are to each other.

In still other examples, other algorithms may be used, such as cluster analysis algorithms such as hierarchical clustering algorithms, distribution based clustering algorithms, density based clustering algorithms, and the like. Those members that are clustered into the same cluster as one of the profiles of previous recipients of an out-of-network message may be considered to have a high score for this recommendation criterion.

In other examples, other recommendation criteria may include how closely the interests and intentions of the sending member match the interests and intentions of the members of the social networking service. For example, the social networking service may define one or more predefined personas for all members. These personas may be broken down into two components: intent—i.e., the various reasons that members use the social networking service (e.g., job searching, connection forming, or the like), and interests, i.e., various things members are interested in (e.g., patent law, software engineering, or the like). The social networking service may assign probabilities for each predefined intent category and probabilities for each predefined interest category. The probability reflects the likelihood that based on information and observed activity known to the social networking service, the member has one of the predefined intent and interests. For example, a member who is actively viewing pages regarding job opportunities and includes profile attributes indicating interest in software development may be determined to have a high probability of a job seeking intent and a high probability of being interested in software development. This may be implemented in some examples based upon training sets of data in which members are manually classified into the various categories based upon the information the social networking service knows about them. These manually classified member profiles may then be used as training data for a classification algorithm. For example, a Bayesian classifier may be used.

The interests and intent of the sending member, as determined by the system, may be matched with members who have corresponding interests and intents. Members with interests and intent corresponding to that of the sending member may have a higher likelihood of being recommended to the sending member for an out-of-network communication. For example, the sending member may be a recruiter interested in software engineers. These sending members may be matched with software engineers who are looking for a job. Note that as described, both interests and intent are used as selection criteria, but in some examples, only interests or only intent may be utilized.

To determine the interests and intent of the sending members, the system may use the same techniques described above. In particular, the system may examine past out-of-network communications to determine the interests and intent of the sending member. For example, if a particular member sends a lot of out-of-network communications to patent attorneys who are looking for new jobs, the system may determine the intent of the sending member is that of a recruiter or employer and the interest is patent law. In yet other examples, the system may explicitly ask the sending member about their interests and intents through dialogue boxes or other inputs.

The system may determine a score representing how closely the interests and intent of the sending member matches the interests and intent of the members in the set of potential recommended members. For example the system may maintain a list of interests and intents that correspond to each other. For example, a recruiter intent may be listed as corresponding to intents such as a job-seeker intent. Corresponding intents may include more than two intents. For example, an intent to use the social networking service to meet new people (e.g., to network) may correspond to a recruiter intent, a networking intent, a sales intent (e.g., to use the social networking service to sell products or services), or the like.

In addition, the list of corresponding interests and intents may contain a similarity score. For example, a recruiter intent may correspond with both a job-seeker intent and a networking intent, but may correspond more with the job-seeker intent. Thus a member with a job-seeker intent would score higher than one with a networking intent.

In addition to predefined lists and scores based on those lists, the system may also utilize one or more of the previously discussed clustering algorithms to cluster groups of members with corresponding interests and intents. The score may then be based upon how close the various interests and intents of the potential recommended member is to the interests and intents of the sending member.

The social network may also use a likelihood of response as a recommendation criterion in determining which members to recommend. For example, the social networking service may determine a member's likelihood of responding to an out-of-network message by using a level of activity associated with the social networking service as a proxy for responsiveness. Those members who have a higher likelihood of responding may have a higher likelihood of being recommended to the sending member for an out-of-network communication. For example, if a member checks their messages on the social networking service often, they are more likely to see and respond to the out-of-network messages. Other activities which may indicate a willingness to respond include may include: logging in, visiting other member profiles, adding skills, endorsing other members for skills, responses to previous out-of-network messaging, utilizing the communications methods provided by the social networking service, or the like.

The responsiveness of a member in the set of potential recommended members may be scored based upon factors which indicate a likelihood of responding. For example, the number of days the member logs into the social network or otherwise visits the social network may be compared to an average member and then scored based upon this comparison. This score may then be weighted and used with other measures (which may be calculated similarly) of responsiveness to produce a total responsiveness score to produce a composite likelihood of response score.

In some examples, the likelihood of response may be to out-of-network messages in general, but in other examples the specific type of out-of-network message may be considered when determining a likelihood of response. For example, if the type of message matches a particular interest of the recipient member, the likelihood of reply may increase (e.g., if the member is a job seeker and the message is a job opportunity).

Once all the various criteria are scored, the system may use various algorithms to determine members to recommend from the set of potential recommended members. Turning now to FIG. 1, an example recommendation algorithm using three criteria (e.g., profile similarity, response likelihood, and intent and interest matching) is shown. Note that while the algorithm in FIG. 1 uses three selection criteria, other algorithms may use more than three or less than three selection criteria. The degree that a particular member matches the intent and interests of the sending member, the degree that a particular member matches a desired profile of the sending member, and the likelihood of a response all increase going away from the origin (0, 0, 0). Thus a score of (0, 0, 0) represents no match between intent and interests, no response likelihood and no profile similarity. As a member's scores move away from the origin, the more optimal the member is for recommendation for an out-of-network contact.

In some examples, the member whose (x, y, z) scores are at least, or greater than a pre-determined (x, y, z) threshold score may be recommended. That is if the interests and intent match is greater than the (x) threshold, the response likelihood is greater than the (z) threshold, and the profile similarity is greater than the (y) threshold, then the member is recommended to the sending member for an out-of-network message. Stated differently, if the point formed from the candidate member's interest and intent score, profile similarity score, and response likelihood score is outside of the dotted box 1010 formed from the planes intersecting the corresponding axes at the threshold (FIG. 1), then the member would be recommended. If a lot of members exceed these thresholds, the members recommended may be culled such that only a top ten, top twenty, or the like number of members is recommended.

In other examples, the system may not have predetermined thresholds, but instead, may determine an overall recommendation strength based on the three facets in combination. This may allow for recommendations that might otherwise be strong but for one weak factor. For example, a member with a low likelihood of response may still be recommended if other scores are high. In these examples, each recommendation criteria may be weighted and summed and the final score may be used to determine whether or not to recommend a member. For example: Recommendation Strength=W1*intent & interest+W2*response likelihood+ W3*profile similarity. In this example, the recommendation criteria are weighted by multiplying them by a weighting factor (W1, W2, and W3). It should be noted that one or more of these weights could be zero or one.

In utilizing this recommendation strength, the social networking service could present all members from the set of potential recommended members whose recommendation strength score exceeds a predetermined threshold, or a predetermined number of recommendations may be presented to the user—that is, a top five, a top ten, a top twenty based upon the recommendation strength.

In some examples, the system may utilize individual criteria thresholds and recommendation strength in combination. For example, the (X, Y, Z) thresholds may be a minimum threshold for each recommendation criteria that must be met before the member is considered for a recommendation. For example, a total recommendation strength of 100 points may be needed (with each criteria contributing according to their weight W), with a minimum score for intent and interest of 20 points, response likelihood of 10 points, and profile similarity of 30 points. Clearly, if only the minimums are met, the overall minimum of 100 points has not been met, thus at least one of the facets will need to be over their allotted minimums, however, this method requires all facets to contribute something to allow the candidate member to be recommended. For example, this prevents a member who otherwise would be very strong from being recommended if there is almost no likelihood of response. The set of members meeting this minimum threshold may then be sorted based upon recommendation strength. The top five, ten, twenty, or the like may then be recommended.

Figure 2:
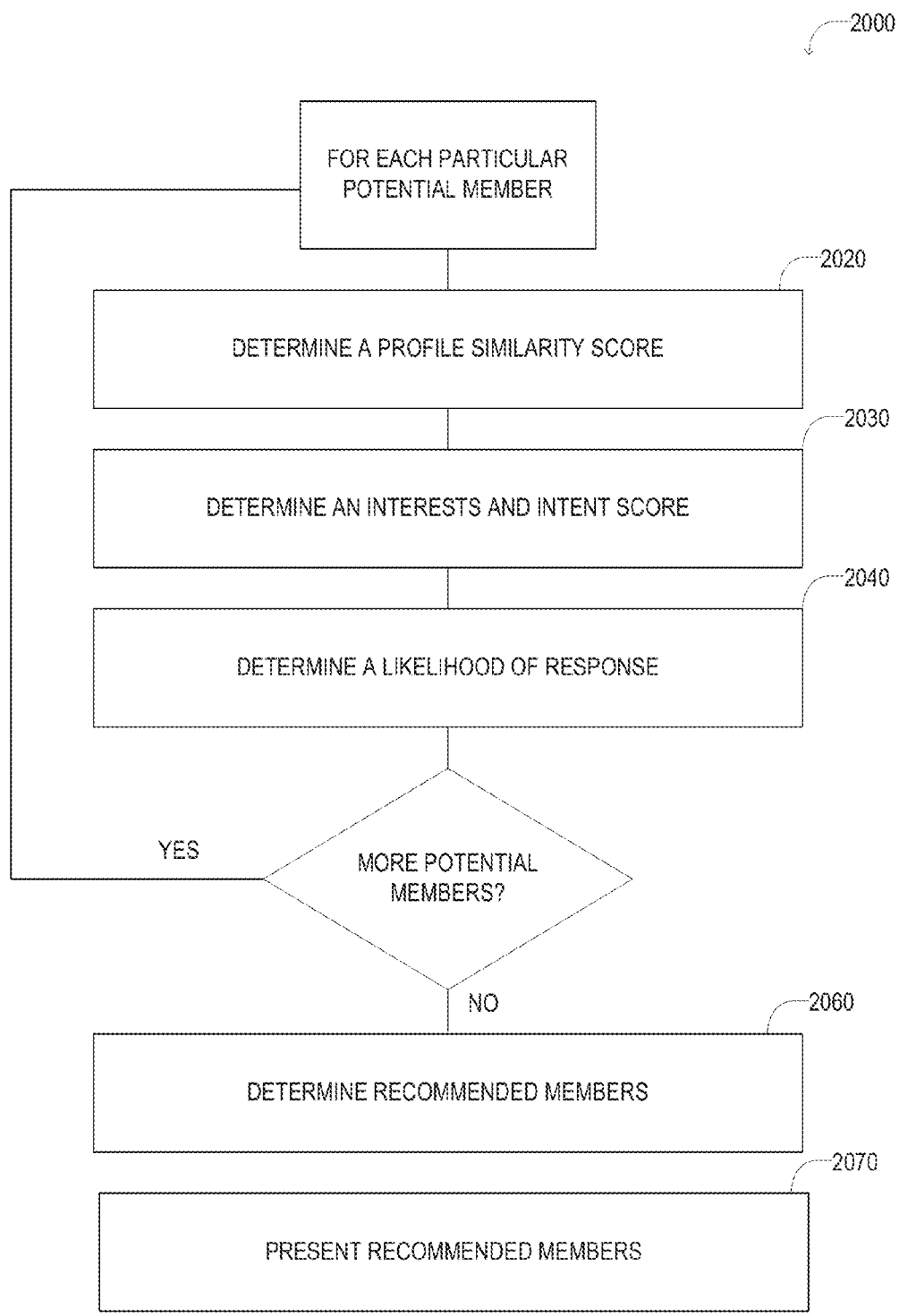
FIG. 2 shows a recommendation flowchart according to some examples of the present disclosure.

Turning now to FIG. 2, one example method 2000 of providing recommended targets for out-of-network messaging is shown. For each member in the set of potential recommended members the system may determine a profile similarity score at operation 2020, an interests and intent score 2030, and a likelihood of response score 2040. The set of potential members may be all the members of the social networking service, or a subset of the members of the social networking service, or the like (e.g., some members may be given an opportunity to opt-out of these out-of-network communications).

At operation 2020 for each particular member in the set of potential members, the system may determine a profile similarity score at operation 2020. As already noted, this may be based upon how close the particular member in the set of potential members matches one or more target profiles associated with the sending member. For example, the one or more target profiles may be profiles of previous members that the sending member has previously communicated with out of network. One or more of the target profiles may also be based upon a profile explicitly selected by the sending member in response to one or more dialogue boxes (e.g., the system may prompt the sending member to select a profile that is similar to the type of person they are interested in). In yet other examples, the sending member may simply be asked what particular profile attributes they are interested in. The score calculated in operation 2020 may represent how closely a particular member's profile matches the particular profile attributes (either expressed by a selection of a member profile, a profile of a previous member, or explicit selection of member profile attributes, or the like) the sending member is interested in.

At operation 2030, the system may determine an interests and intent score to describe how closely the particular member in the set of potential recommended members matches the interests and intent of the sending member. The interests and intent of the members in the set of potential recommended members may be determined based upon their activity on the social networking service and information in their member profiles. The interests and intent of the sending member may be explicitly solicited from the sending member, inferred from recipients of previous out-of-network communications from this member, or from the sending member's own profile and activities. The score calculated in operation 2030 may represent how closely the interests and intent of the particular member corresponds to the interests and intent of the sending member.

At operation 2040, a likelihood of response may be determined which describes how likely the candidate member is to respond to the out-of-network message. As already noted, this may be based upon activity such as how frequently the particular member logs in, how promptly the member responds to invitations to connect, how promptly the member responds to messages, and the like. This score may be general to out-of-network communications in general, or to the specific type of message that the particular sending member is interested in sending (as determined by the interests and intent of the sending member). For example, if the sending member is a recruiter trying to find job candidates, the system may determine whether or not the potential member is likely to respond to such specific requests based on whether or not they responded to job inquires in the past, or whether or not they had been engaging in job seeking activities on the social networking service recently. This score represents a likelihood of whether or not the member will respond.

After all the potential members are scored, the group of recommended members may be determined at operation 2060 according to the methods already described. For example, the group of recommended members may be chosen based on the three scores calculated in operations 2020-2040. In some examples the group of recommended members may be those that are above a threshold in each of the profile similarity score, interests and intent score, and likelihood of response score. In some other examples the scores may be combined (and in some examples weighted based on the system's view of the importance of each factor relative to the other factors) and the members who have combined scores above a particular threshold score may be recommended. In other examples, the combined (and in some examples weighted) scores may be used to select the top 5, 10, 15, or more candidate members to present. In other examples the top 5%, 10%, 15% of candidate members are recommended. In still yet other examples, each individual score may need to be above a particular threshold in order for the candidate to be recommended.

The recommended members may be presented at operation 2070 to the sending member. In some examples, the recommended members may be presented in an order that reflects their combined score—thus members with a higher combined score will be presented first, before members with a lower score.

In some examples, the sending member may give the system feedback on its recommendation choices. This feedback may be used to fine tune the recommendations by fine tuning the interests and intent, the profile attributes that the sending member desires, and the likelihood of response.

The sending member may give feedback to the system directly: e.g., a button labeled "this recommendation is not relevant" or may indirectly give feedback. For example, selection of a recommended member for sending an out-of-network message may give the system confidence that the recommendation is relevant without explicit feedback from the sending member. This system may utilize this feedback in order to improve subsequent recommendations. For example, if a member scores highly in one aspect of the recommendation criteria (e.g., the interests and intent match is particularly high), the system may alter the weights used in computing the recommendation strength to more heavily weigh recommendation criteria that the chosen member scored high in. The system may also lower the weights of those criteria to which the chosen member performed poorly in. For example, if the chosen member had a high interests and intents match but a low profile similarity, the system may adjust the recommendation criteria to increase the weights of the intent and interest criteria and in some examples decrease the weights given to the profile similarity criteria.

As already explained, the selected member's profile may be used in calculating a profile similarity score for future recommendations. This is also a form of sender feedback as members subsequently recommended may more closely match the profile attributes of the chosen member as already explained.

In some examples, the system may also use the interests and intent classifications of members that are sent out-of-network communications by the sending member in calculating the sending member's intent and interests. This is also a form of feedback. For example, if the sending member frequently sends out-of-network messages to job-seekers, the system may infer that the intent of the sending member is that of a recruiter.

In order to assist members in providing feedback, when the member is presented with the recommendations, the sending member may be presented with one or more dimensions of similarity which describe generalized reasons why that particular member was recommended. The dimensions of similarity may describe the member profile attributes that made the recommended member similar to the recipient member to which the sending member previously sent an out-of-network message to. Certain dimensions may be left vague to avoid privacy concerns. For example, the system may not show that a particular member has job seeking intent or behavior. Disclosing this particular level of granularity may cause embarrassment to that member as they may not wish to share this intent with others. However, the representation of profile similarity in the context of the sending members recruiting intent gives members an indication of why the members were recommended without divulging too much.

FIG. 3 shows an example screenshot 3000 of a dialog box for sending an out-of-network communication. In the example of FIG. 3, an email is shown. This dialog box may appear after a user has already selected a particular member for sending an out-of-network communication. In some examples, the system may show one or more profile attributes 3010 that the sending member and the recipient member have in common (e.g., people, experience, education, or the like). This may assist the sending member in personalizing their message to the recipient. The system may also share tips for successful communications with users (e.g., "limit your message to 100 words") at 3020.

Figure 4:
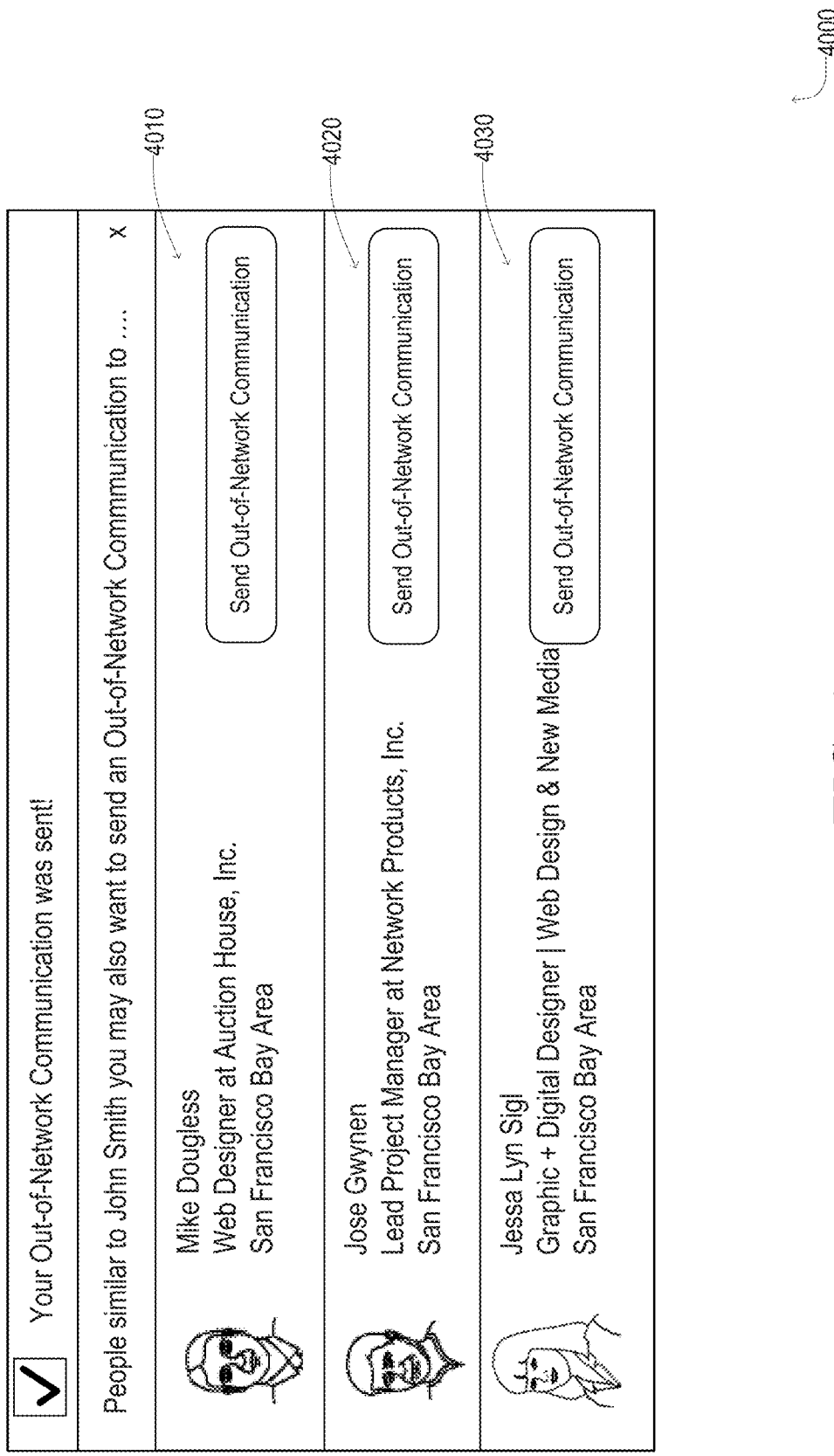
FIG. 4 shows a user interface according to some examples of the present disclosure.

FIG. 4 shows an example of a dialog 4000 which may show up after the message is sent to the member. Dialog 4000 contains recommendations 4010-4030 of other members which the system has determined would match the interests and intent of the sending member, matches the profile attributes of the most recent out-of-network recipient of a message sent by the sending member, and would have a high likelihood of responding. The sending member may then select one or more of the recommended members for sending an out-of-network communication.

FIG. 5 shows another example user interface 5000 displaying various members the system has recommended to the sending member for an out-of-network communication. Specifically, the sending member has previously sent out-of-network messages to "John Smith," and "Leo Fitzsimmons." Recommendations similar to each of these members are displayed 5010 and 5020. FIG. 5 also shows why each member was recommended based upon dimensions of similarity (e.g., "Based on Geography, Function, Seniority, and Industry"). These dimensions provide customer-centric reasoning of why recommendations are made while making certain key dimensions opaque. It also provides for the aforementioned learning mechanisms. In FIG. 5, the most relevant recommendations are displayed, however the sending member may show additional recommendations based on each previous out of network communication by selecting a "See More" user interface element 5030.

Figure 6:
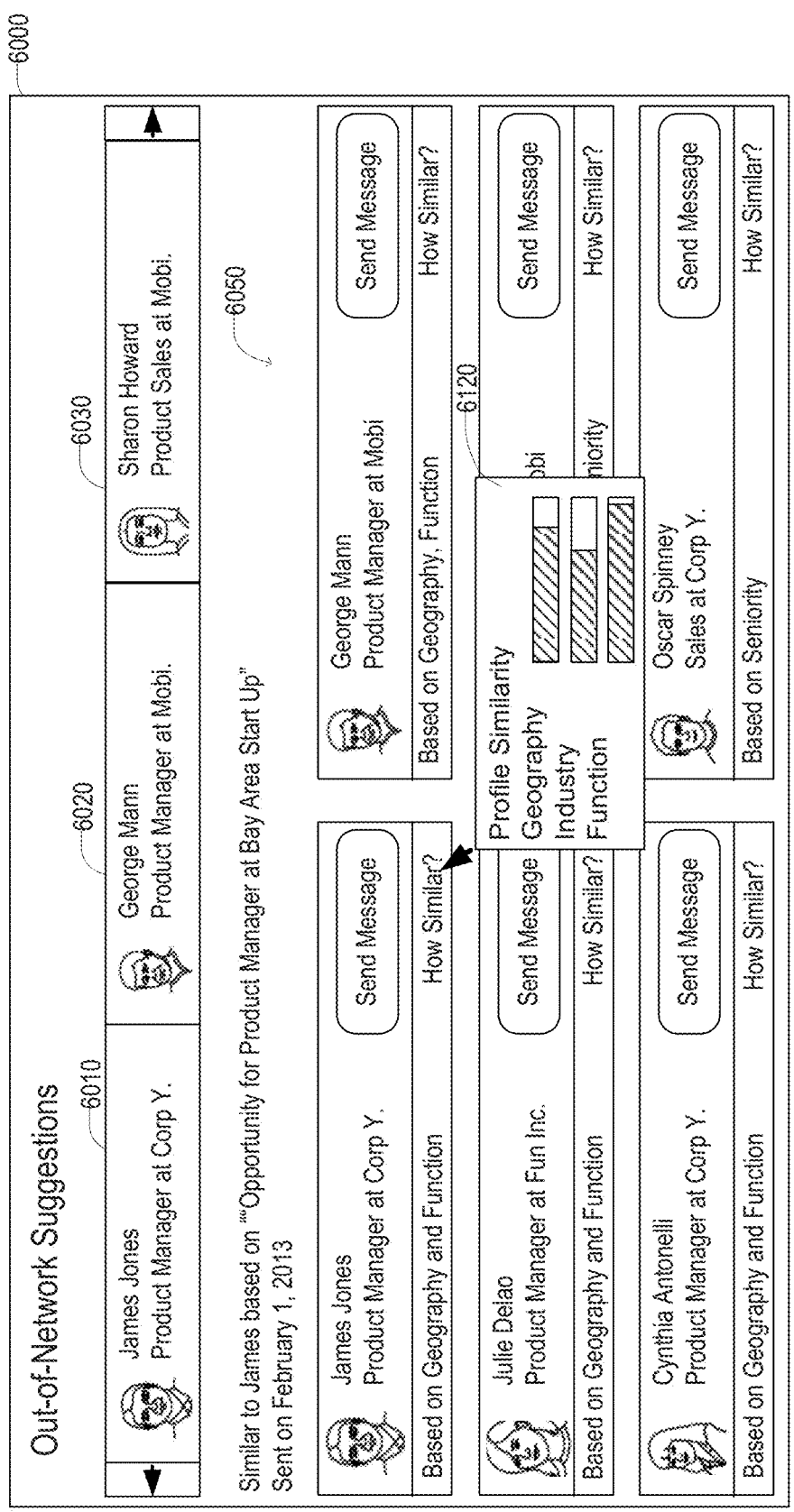
FIG. 6 shows a user interface according to some examples of the present disclosure.

The user interface 6000 of FIG. 6 is similar to the user interface of FIG. 5, however user interface 6000 is tabbed. Across the top, the tabs 6010-6030 show members to which the sending member (the member viewing this page) has previously sent out-of-network communications. Selecting one of the tabs brings up a page 6050 of recommended members with similar profiles. FIG. 6 also shows feedback 6120 given to the sending member in the form of an indication on how similar various recommended member's profile attributes are to the member the sender previously sent an out-of-network connection to. In the example of FIG. 6, the feedback is selected by interacting with (e.g., hovering over with a mouse cursor, clicking, tapping on a touch screen, or the like) the "How Similar?" interface element.

Figure 7:
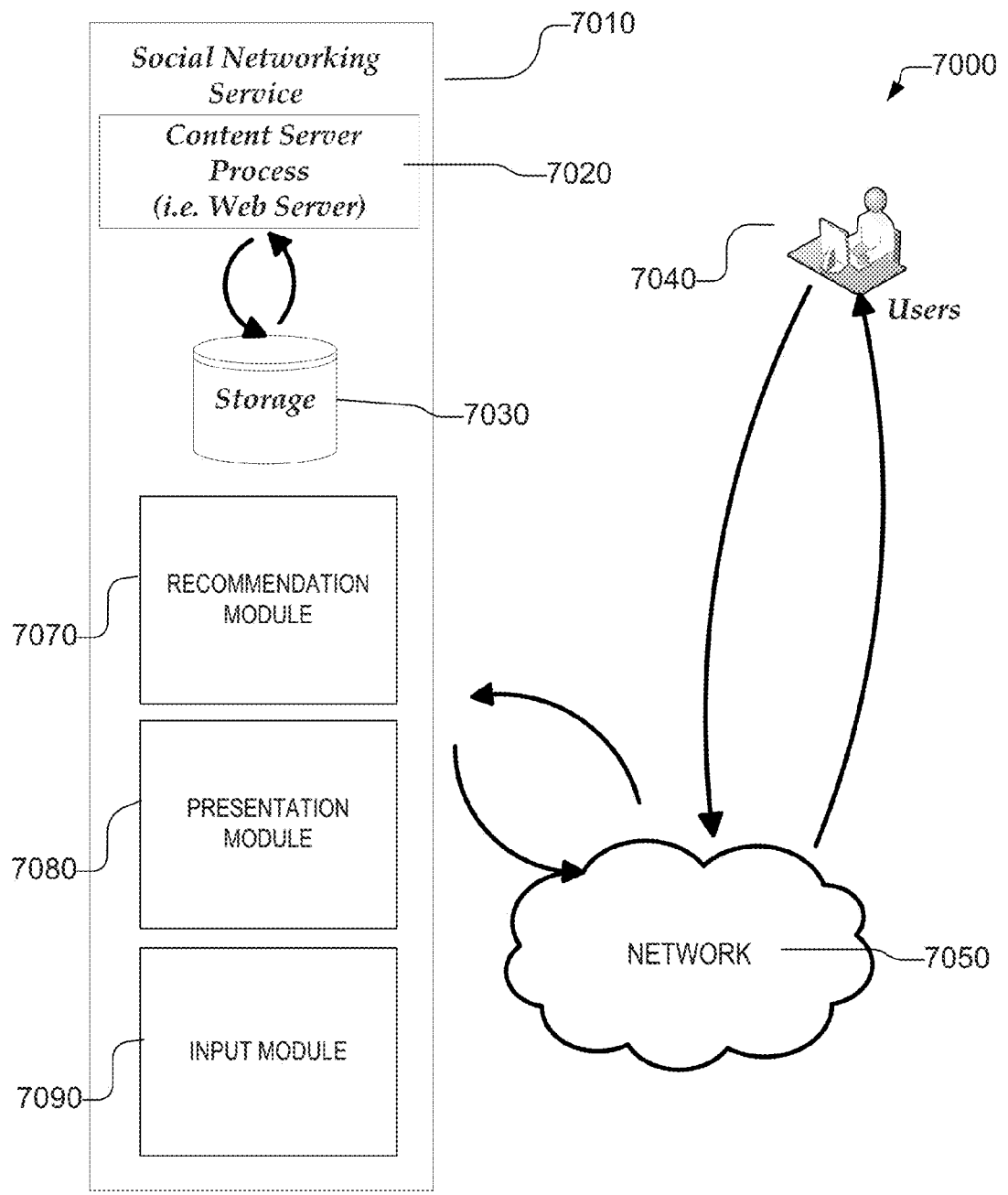
FIG. 7 shows a schematic of a social networking service according to some examples of the present disclosure.

FIG. 7 shows an example system 7000 for providing a social networking service and for providing out-of-network communication recipient recommendations. Social networking service 7010 may contain a content server process 7020. Content server process 7020 may communicate with storage 7030 and may communicate with one or more users 7040 through a network 7050. Content server process 7020 may be responsible for the retrieval, presentation, and maintenance of member profiles stored in storage 7030. Content server process 7020 in one example may include or be a web server that fetches or creates internet web pages. Web pages may be or include Hyper Text Markup Language (HTML), eXtensible Markup Language (XML), JavaScript, or the like. The web pages may include portions of, or all of, a member profile at the request of users 7040.

Users 7040 may include one or more members, prospective members, or other users of the social networking service 7040. For example, users 7040 may include sending members, recipient members, or the like. Users 7040 access social networking service 7010 using a computer system through a network 7050. The network may be any means of enabling the social networking service 7010 to communicate data with users 7040. Example networks 7050 may be or include portions of: the Internet, a Local Area Network (LAN), a Wide Area Network (WAN), wireless network (such as a wireless network based upon an IEEE 802.11 family of standards), a Metropolitan Area Network (MAN), a cellular network, or the like.

Recommendation module 7070 may generate a list of recommended members for a sending member. The recommended members list may be generated based upon a number of factors including profile similarities, intent and interest matching, likelihood of responding, or the like.

Presentation module 7080 may generate the presentations to show to members the recommendations generated by the recommendation module. For example, presentation module 7080 may produce the user interfaces of FIGS. 3-6. These presentations may take any suitable form such as: emails (which may be sent by the presentation module), web-pages, data for applications on the client's computing system 7040 that cause a presentation such as those shown in FIGS. 3-6, modifications to user profiles stored in storage 7030 or the like. The presentation module 7080 may interact with the content server process 7020 in order to achieve these functions.

Input module 7090 may receive and process input from members regarding the set of recommended members. For example, the input module 7090 may receive information regarding members that the sending member wishes to send out-of-network communications to, receive feedback on recommendations, and the like. Input module 7090 may also work with recommendation module 7070, presentation module 7080 and content server process 7020 to achieve these functions.

The functionality of the recommendation module 7070, presentation module 7080, input module 7090, content server process 7020 and storage 7030 may be implemented by any one of the aforementioned modules. Thus while a module is described as performing certain functionality, one skilled in the art with the benefit of Applicant's disclosure may appreciate that other modules may perform that functionality instead of or in addition to the module described herein.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
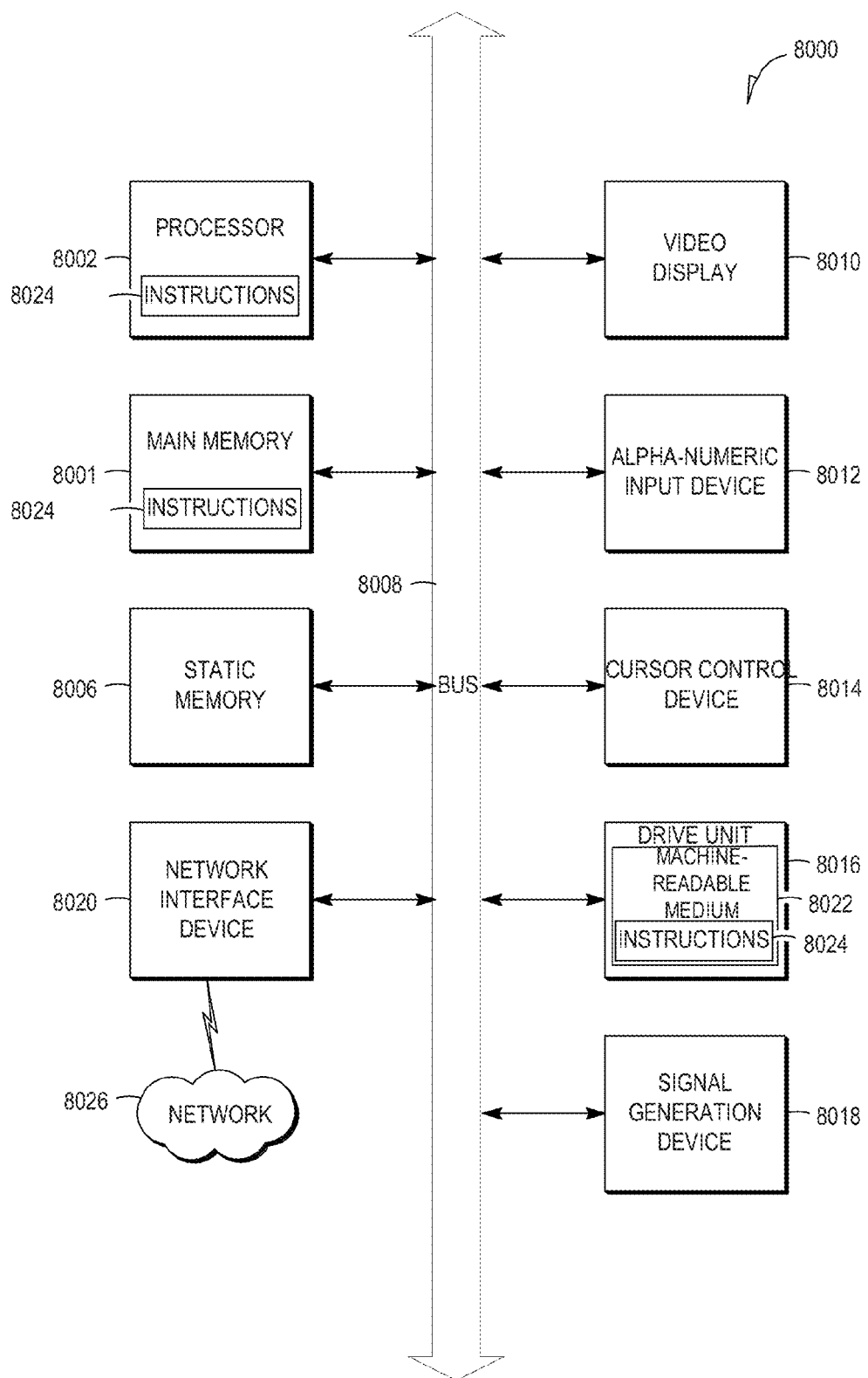
FIG. 8 shows a schematic of a machine according to some examples of the present disclosure.

FIG. 8 is a block diagram of machine in the example form of a computer system 8000 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a notebook PC, a docking station, a wireless access point, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The machine may contain components not shown in FIG. 8 or only a subset of the components shown in FIG. 8.

The example computer system 8000 includes a processor 8002 (e.g., a central processing unit (CPU), a graphics processing unit (GPU) or both), a main memory 8004 and a static memory 8006, which communicate with each other via a bus 8008. The computer system 8000 may further include a video display unit 8010 (e.g., a liquid crystal display (LCD) or a cathode ray tube (CRT)). The computer system 8000 also includes an alphanumeric input device 8012 (e.g., a keyboard), a user interface (UI) navigation device 8014 (e.g., a mouse), a disk drive unit 8016, a signal generation device 8018 (e.g., a speaker) and a network interface device 8020.

Machine-Readable Medium

The disk drive unit 8016 includes a machine-readable medium 8022 on which is stored one or more sets of instructions and data structures (e.g., software) 8024 embodying or used by any one or more of the methodologies or functions described herein. The instructions 8024 may also reside, completely or at least partially, within the main memory 8004, static memory 8006, and/or within the processor 8002 during execution thereof by the computer system 8000, the main memory 8004 and the processor 8002 also constituting machine-readable media.

While the machine-readable medium 8022 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices (e.g., Erasable Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

Transmission Medium

The instructions 8024 may further be transmitted or received over a communications network 8026 using a transmission medium. The instructions 8024 may be transmitted using the network interface device 8020 and any one of a number of well-known transfer protocols (e.g., HTTP). Examples of communication networks include a LAN, a WAN, the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software. Network interface 8020 may wirelessly transmit data and may include an antenna.

Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Other Notes and Examples

The following are one or more non-limiting examples of the present disclosure.

Example 1

A method for recommending an out-of-network communication recipient, the method comprising: determining a set of potential recommended members of a social networking service; determining for each particular member in the set of potential recommended members: a profile similarity score, the profile similarity score indicating a measure of how similar the particular member is to a previous target member of an out-of-network communication of a sending member; and a recommendation criteria score, the recommendation criteria score being a measure of how closely the particular member matches a recommendation criteria; determining a set of recommended members from the set of potential recommended members based upon the profile similarity scores and the recommendation criteria scores of the members in the set of potential recommended members; presenting the set of recommended members to the sending member; and sending an out-of-network communication to a selected member of the set of recommended member from the sending member.

Example 2

The method of example 1, wherein the set of potential recommended members is all the members of the social networking service.

Example 3

The method of any one of examples 1-2, wherein the profile similarity score is determined based upon the member profile attributes that the particular member has in common with the previous target member.

Example 4

The method of any one of examples 1-3, wherein the recommendation criteria is an interest, and the recommendation criteria score is determined based upon how closely a determined interest of the particular member corresponds to a determined interest of the sending member.

Example 5

The method of any one of examples 1-3, wherein the recommendation criteria is an intent, and the recommendation criteria score is determined based upon how closely a determined intent of the particular member corresponds to a determined intent of the sending member.

Example 6

The method of claim 5, further comprising a second recommendation criteria, the second recommendation criteria is an interest, and the recommendation criteria score is determined based upon how closely a determined interest of the particular member corresponds to a determined interest of the sending member, and the set of recommended members is determined also based upon the second recommendation criteria.

Example 7

The method of any one of examples 1-6, wherein the members in the set of recommended members are determined from the set of potential recommended members based upon their profile similarities scores being above a first predetermined threshold and their recommendation criteria scores being above a second predetermined threshold.

Example 8

The method of any one of examples 1-6, further comprising: for each recommended member calculating a recommendation score based upon the profile similarities score and the recommendation criteria scores, and determining a set of recommended members comprises selecting the members in the potential recommended member set whose recommendation score exceeds a predetermined threshold.

Example 9

The method of any one of claims 1-3, 7, and 8, wherein the recommendation criteria is a response likelihood to an out-of-network message, and the recommendation criteria score is determined based upon how likely the particular member is to respond to the out-of-network communication.

Example 10

A system for recommending an out-of-network communication recipient, the system comprising: a recommendation module, operating on one or more computer processors, and configured to: determine a set of potential recommended members of a social networking service; determine for each particular member in the set of potential recommended members: a profile similarity score, the profile similarity score indicating a measure of how similar the particular member is to a previous target member of an out-of-network communication of a sending member; and a recommendation criteria score, the recommendation criteria score being a measure of how closely the particular member matches a recommendation criteria; determine a set of recommended members from the set of potential recommended members based upon the profile similarity scores and the recommendation criteria scores of the members in the set of potential recommended members; and a presentation module, configured to: present the set of recommended members to the sending member; and send an out-of-network communication to a selected member of the set of recommended member from the sending member.

Example 11

The system of example 10, wherein the set of potential recommended members is all the members of the social networking service.

Example 12

The system of any one of examples 10-11, wherein the recommendation module is configured to determine the profile similarity score based upon the member profile attributes that the particular member has in common with the previous target member.

Example 13

The system of any one of examples 10-12, wherein the recommendation criteria is an interest, and the recommendation module is configured to determine the recommendation criteria score based upon how closely a determined interest of the particular member corresponds to a determined interest of the sending member.

Example 14

The system of examples 10-12, wherein the recommendation criteria is an intent, and the recommendation module is configured to determine the recommendation criteria score based upon how closely a determined intent of the particular member corresponds to a determined intent of the sending member.

Example 15

The system of example 14, further comprising a second recommendation criteria, the second recommendation criteria is an interest, and the recommendation module is configured to determine the recommendation criteria score based upon how closely a determined interest of the particular member corresponds to a determined interest of the sending member, and the set of recommended members is determined also based upon the second recommendation criteria.

Example 16

The system of any one of examples 10-15, wherein the recommendation module is configured to determine the members in the set of recommended members from the set of potential recommended members based upon their profile similarities scores being above a first predetermined threshold and their recommendation criteria scores being above a second predetermined threshold.

Example 17

The system of any one of examples 10-15, further comprising: for each recommended member calculating a recommendation score based upon the profile similarities score and the recommendation criteria scores, and determining a set of recommended members comprises selecting the members in the potential recommended member set whose recommendation score exceeds a predetermined threshold.

Example 18

The system of any one of examples 10-12, 16, and 17, wherein the recommendation criteria is a response likelihood to an out-of-network message, and the recommendation module is configured to determine the recommendation criteria score based upon how likely the particular member is to respond to the out-of-network communication.

Example 19

A machine readable medium that stores instructions which when performed by a machine, cause the machine to perform operations comprising: determining a set of potential recommended members of a social networking service; determining for each particular member in the set of potential recommended members: a profile similarity score, the profile similarity score indicating a measure of how similar the particular member is to a previous target member of an out-of-network communication of a sending member; and a recommendation criteria score, the recommendation criteria score being a measure of how closely the particular member matches a recommendation criteria; determining a set of recommended members from the set of potential recommended members based upon the profile similarity scores and the recommendation criteria scores of the members in the set of potential recommended members; presenting the set of recommended members to the sending member; and sending an out-of-network communication to a selected member of the set of recommended member from the sending member.

Example 20

The machine-readable medium of example 19, wherein the set of potential recommended members is all the members of the social networking service.

Example 21

The machine-readable medium of any one of examples 19-20, wherein the instructions for determining the profile similarity score include instructions, which when performed by the machine, cause the machine to perform the operations of determining the profile similarity score based upon the member profile attributes that the particular member has in common with the previous target member.

Example 22

The machine-readable medium of any one of examples 19-21, wherein the recommendation criteria is an interest, and the instructions for determining the recommendation criteria score include instructions, which when performed by the machine, cause the machine to perform the operations of determining the recommendation criteria score based upon how closely a determined interest of the particular member corresponds to a determined interest of the sending member.

Example 23

The machine-readable medium of any one of examples 19-21, wherein the recommendation criteria is an intent, and the instructions for determining the recommendation criteria score include instructions, which when performed by the machine, cause the machine to perform the operations of determining the recommendation criteria score based upon how closely a determined intent of the particular member corresponds to a determined intent of the sending member.

Example 24

The machine-readable medium of any one of examples 23, further comprising a second recommendation criteria, the second recommendation criteria is an interest, and the instructions for determining the recommendation criteria score include instructions, which when performed by the machine, cause the machine to perform the operations of determining the recommendation criteria score based upon how closely a determined interest of the particular member corresponds to a determined interest of the sending member, and the set of recommended members is determined also based upon the second recommendation criteria.

Example 25

The machine-readable medium of any one of examples 19-24, wherein the instructions for determining the set of recommended members include instructions, which when performed by the machine, cause the machine to perform the operations of determining the set of recommended members from the set of potential recommended members based upon their profile similarities scores being above a first predetermined threshold and their recommendation criteria scores being above a second predetermined threshold.

Example 26

The machine-readable medium of any one of examples 19-24, wherein the instructions further comprise instructions, which when performed by the machine, cause the machine to perform the operations of: calculating a recommendation score for each recommended member based upon the profile similarities score and the recommendation criteria scores, and the instructions for determining the set of recommended members comprises instructions, which when performed by the machine, causes the machine to perform the operations of determining the set of recommended members by selecting the members in the potential recommended member set whose recommendation score exceeds a predetermined threshold.

Example 27

The machine-readable medium of any one of examples 19-21, 25, and 26, wherein the recommendation criteria is a response likelihood to an out-of-network message, and the instructions for determining the recommendation criteria score include instructions, which when performed by the machine, cause the machine to perform the operations of determining the recommendation criteria score based upon how likely the particular member is to respond to the out-of-network communication.

What is claimed is:

1. A computer implemented method executed in conjunction with a social networking service, the method comprising:
   determine a previous target member of the social networking service, the previous target member being a past communication target of a sending member of the social networking service, the sending member and the previous target member being further than a predetermined social network distance from each other on the social networking service;
   determine first and second profile similarity scores for first and second members of the social networking service, the first and second members being further than the predetermined social network distance from the sending member on the social networking service, the first profile similarity score quantifying a determined similarity between a value of an attribute in a member profile of the first member and a value of an attribute in a member profile of the previous target member, the second profile similarity score quantifying a determined similarity between a value of an attribute in a member profile of the second member and a value of an attribute in the member profile of the previous target member;
   determine a recommended out of network communication recipient based upon a comparison of the first and second profile similarity scores, the recommended out of network communication recipient being either the first or second member;
   present the recommended out-of-network communication recipient to the sending member in a graphical user interface of the social networking service;
   receive an input from the sending member indicating that the sending member would like to send a communication to the recommended out-of-network communication recipient; and
   send an electronic communication to the recommended out-of-network communication recipient.

2. The computer implemented method of claim 1, wherein the predetermined social network distance is a first degree connection.

3. The computer implemented method of claim 1, wherein the computer processors are further configured to:
   determine a first interest score for the first member that is determined based upon how closely a determined interest of the first member corresponds to a determined interest of the sending member;
   determine a second interest score for the second member that is determined based upon how closely a determined interest of the second member corresponds to a determined interest of the sending member; and
   wherein the one or more processors are configured to determine a recommended out of network communication recipient based upon a comparison of the first and second profile similarity scores and based upon the first and second interest scores, the recommended out of network communication recipient being either the first or second member.

4. The computer implemented method of claim 3, wherein the computer processors are configured to determine the first interest score using a Bayesian classifier.

5. The computer implemented method of claim 1, wherein the computer processors are further configured to:
   determine a first intent score for the first member that is determined based upon how closely a determined intent of the first member corresponds to a determined intent of the sending member;
   determine a second intent score for the second member that is determined based upon how closely a determined intent of the second member corresponds to a determined intent of the sending member; and
   wherein the one or more processors are configured to determine a recommended out of network communication recipient based upon a comparison of the first and second profile similarity scores and based upon the first and second intent scores, the recommended out of network communication recipient being either the first or second member.

6. The computer implemented method of claim 5, wherein the computer processors are configured to determine the first intent score using a Bayesian classifier.

7. The computer implemented method of claim 1, wherein the computer processors are further configured to:
   determine a first interest score for the first member that is determined based upon how closely a determined interest of the first member corresponds to a determined interest of the sending member;
   determine a first intent score for the first member that is determined based upon how closely a determined intent of the first member corresponds to a determined intent of the sending member;
   determine a second interest score for the second member that is determined based upon how closely a determined interest of the second member corresponds to a determined interest of the sending member;
   determine a second intent score for the second member that is determined based upon how closely a determined intent of the second member corresponds to a determined intent of the sending member; and
   wherein the one or more processors are configured to determine a recommended out of network communication recipient based upon a comparison of the first and second profile similarity scores and based upon the first and second intent and interest scores, the recommended out of network communication recipient being either the first or second member.

8. A system comprising:
   a memory;
   one or more computer processors coupled to the memory and configured to:
   determine a previous target member of a social networking service, the previous target member being a past communication target of a sending member of the social networking service, the sending member and the previous target member being further than a predetermined social network distance from each other on the social networking service;
   determine first and second profile similarity scores for first and second members of the social networking service, the first and second members being further than the predetermined social network distance from the sending member on the social networking service, the first profile similarity score quantifying a determined similarity between a value of an attribute in a member profile of the first member and a value of an attribute in a member profile of the previous target member, the second profile similarity score quantifying a determined similarity between a value of an attribute in a member profile of the second member and a value of an attribute in the member profile of the previous target member;

determine a recommended out of network communication recipient based upon a comparison of the first and second profile similarity scores, the recommended out of network communication recipient being either the first or second member;

present the recommended out-of-network communication recipient to the sending member in a graphical user interface of the social networking service;

receive an input from the sending member indicating that the sending member would like to send a communication to the recommended out-of-network communication recipient; and send an electronic communication to the recommended out-of-network communication recipient.

9. The system of claim 8, wherein the predetermined social network distance is a first degree connection.

10. The system of claim 8, wherein the one or more computer processors are further configured to:

determine a first interest score for the first member that is determined based upon how closely a determined interest of the first member corresponds to a determined interest of the sending member;

determine a second interest score for the second member that is determined based upon how closely a determined interest of the second member corresponds to a determined interest of the sending member; and wherein the one or more processors are configured to determine a recommended out of network communication recipient based upon a comparison of the first and second profile similarity scores and based upon the first and second interest scores, the recommended out of network communication recipient being either the first or second member.

11. The system of claim 10, wherein the one or more computer processors are configured to determine the first interest score using a Bayesian classifier.

12. The system of claim 8, wherein the one or more computer processors are further configured to:

determine a first intent score for the first member that is determined based upon how closely a determined intent of the first member corresponds to a determined intent of the sending member;

determine a second intent score for the second member that is determined based upon how closely a determined intent of the second member corresponds to a determined intent of the sending member; and wherein the one or more processors are configured to determine a recommended out of network communication recipient based upon a comparison of the first and second profile similarity scores and based upon the first and second intent scores, the recommended out of network communication recipient being either the first or second member.

13. The system of claim 12, wherein the one or more computer processors are configured to determine the first intent score using a Bayesian classifier.

14. The system of claim 8, wherein the computer processors are further configured to:

determine a first interest score for the first member that is determined based upon how closely a determined interest of the first member corresponds to a determined interest of the sending member;

determine a first intent score for the first member that is determined based upon how closely a determined intent of the first member corresponds to a determined intent of the sending member;

determine a second interest score for the second member that is determined based upon how closely a determined interest of the second member corresponds to a determined interest of the sending member;

determine a second intent score for the second member that is determined based upon how closely a determined intent of the second member corresponds to a determined intent of the sending member; and wherein the one or more processors are configured to determine a recommended out of network communication recipient based upon a comparison of the first and second profile similarity scores and based upon the first and second intent and interest scores, the recommended out of network communication recipient being either the first or second member.

15. A machine-readable storage medium that stores instructions which configure a machine to:

determine a previous target member of a social networking service, the previous target member being a past communication target of a sending member of the social networking service, the sending member and the previous target member being further than a predetermined social network distance from each other on the social networking service;

determine first and second profile similarity scores for first and second members of the social networking service, the first and second members being further than the predetermined social network distance from the sending member on the social networking service, the first profile similarity score quantifying a determined similarity between a value of an attribute in a member profile of the first member and a value of an attribute in a member profile of the previous target member, the second profile similarity score quantifying a determined similarity between a value of an attribute in a member profile of the second member and a value of an attribute in the member profile of the previous target member;

determine a recommended out of network communication recipient based upon a comparison of the first and second profile similarity scores, the recommended out of network communication recipient being either the first or second member;

present the recommended out-of-network communication recipient to the sending member in a graphical user interface of the social networking service;

receive an input from the sending member indicating that the sending member would like to send a communication to the recommended out-of-network communication recipient; and send an electronic communication to the recommended out-of-network communication recipient.

16. The machine-readable storage medium of claim 15, wherein the predetermined social network distance is a first degree connection.

17. The machine-readable storage medium of claim 15, wherein the instructions configure the machine to:

determine a first interest score for the first member that is determined based upon how closely a determined interest of the first member corresponds to a determined interest of the sending member;

determine a second interest score for the second member that is determined based upon how closely a determined interest of the second member corresponds to a determined interest of the sending member; and wherein the machine is configured to determine a recommended out of network communication recipient based upon a comparison of the first and second profile similarity scores and based upon the first and second interest scores, the recommended out of network communication recipient being either the first or second member.

18. The machine-readable storage medium of claim 17, wherein the instructions configure the machine to determine the first interest score using a Bayesian classifier.

19. The machine-readable storage medium of claim 15, wherein the instructions configure the machine to:
- determine a first intent score for the first member that is determined based upon how closely a determined intent of the first member corresponds to a determined intent of the sending member;
- determine a second intent score for the second member that is determined based upon how closely a determined intent of the second member corresponds to a determined intent of the sending member; and
- wherein the machine is configured to determine a recommended out of network communication recipient based upon a comparison of the first and second profile similarity scores and based upon the first and second intent scores, the recommended out of network communication recipient being either the first or second member.

20. The machine-readable storage medium of claim 19, wherein the instructions configure the machine to determine the first intent score using a Bayesian classifier.

21. The machine-readable storage medium of claim 15, wherein the instructions configure the machine to:
- determine a first interest score for the first member that is determined based upon how closely a determined interest of the first member corresponds to a determined interest of the sending member;
- determine a first intent score for the first member that is determined based upon how closely a determined intent of the first member corresponds to a determined intent of the sending member;
- determine a second interest score for the second member that is determined based upon how closely a determined interest of the second member corresponds to a determined interest of the sending member;
- determine a second intent score for the second member that is determined based upon how closely a determined intent of the second member corresponds to a determined intent of the sending member; and
- wherein the machine is configured to determine a recommended out of network communication recipient based upon a comparison of the first and second profile similarity scores and based upon the first and second intent and interest scores, the recommended out of network communication recipient being either the first or second member.

* * * * *